United States Patent [19]

Cramer et al.

[11] 3,782,402
[45] Jan. 1, 1974

[54] SERVO CONTROLLED OXYGEN REGULATOR

[75] Inventors: Robert L. Cramer; John W. Henneman, both of Davenport, Iowa

[73] Assignee: The Bendix Corporation, South Bend, Ind.

[22] Filed: Oct. 24, 1972

[21] Appl. No.: 300,073

[52] U.S. Cl. .................... 137/81, 137/99, 137/114
[51] Int. Cl. ............................................ A62b 9/00
[58] Field of Search ................... 137/63 R, 81, 114

[56] References Cited
UNITED STATES PATENTS

| | | | |
|---|---|---|---|
| 2,608,200 | 8/1952 | Stockman | 137/81 |
| 3,474,812 | 10/1969 | Robertson | 137/81 |
| 3,509,895 | 5/1970 | Henneman | 137/81 |
| 3,526,241 | 9/1970 | Veit | 137/81 |

Primary Examiner—Henry T. Klinksiek
Assistant Examiner—Richard Gerard
Attorney—Leo H. McCormick, Jr. et al.

[57] ABSTRACT

An oxygen regulator wherein oxygen under pressure passes into a mixing chamber through a first inlet port and a first valve, controlled by a first pressure differential, and ambient air passes into the mixing chamber through a second inlet port and a second valve, controlled by a second pressure differential, to provide breathable fluid capable of maintaining physiological well being in a recipient. The first and second pressure differentials are created by the pressure in the mixing chamber and ambient air pressure. A proportional valve controlled by an aneroid, modifies the effect of the first and second pressure differentials causing the first and second valve to correspondingly open and supply the mixing chamber with correctly ratioed oxygen and ambient air.

11 Claims, 2 Drawing Figures

SERVO CONTROLLED OXYGEN REGULATOR

BACKGROUND OF THE INVENTION

In aircraft wherein maneuvering rapidly changes the altitude of the aircraft, the supply of oxygen needed to maintain the physiological well being of a recipient correspondingly changes. This supply of oxygen is usually controlled by a dilution regulator, such as that disclosed in U.S. Pat. No. 3,509,895 owned by the common assignee of this application and incorporated herein by reference. These oxygen regulators usually fix the proportion of oxygen and ambient air flowing to a recipient in relation to the elevation above sea level. In this dilution regulator, a pressure seal responsive to the pressure of the available oxygen prevents oxygen from flowing up to a fixed altitude while allowing ambient air to flow unobstructed. Above a predetermined elevation, an aneroid opens an exhaust port to relieve the pressure force on the pressure seal permitting oxygen to flow while reducing the ambient air flow. At a fixed elevation above sea level, the aneroid will completely close the flow of ambient air and provide 100 percent oxygen flow to the recipient. However, the flow of oxygen is strictly proportioned as a function of the differential pressure between the ambient air and the available oxygen. Unfortunately, this type of proportioning does not effectively supply the minimum amount of oxygen at low altitudes. The minimum amount of oxygen will maintain the physiological requirement of most recipients flying an aircraft in a range comparable to sea level and thereby stabilize the reaction function of the recipient.

SUMMARY OF THE INVENTION

We have devised an oxygen regulating apparatus utilizing oxygen controlled servo valves for mixing air and ambient air as a function of altitude to provide a breathable fluid which closely follows the minimum physilogical requirements at different altitudes. In our oxygen regulator, the oxygen under pressure is transmitted through a pressure reducing actuation valve which automatically controls and maintains the oxygen under flow at a uniform pressure to a first main valve and a first pilot valve above the first main valve. This same oxygen flow is further transferred to a double diaphragm wall means which controls the flow of ambient air into a mixing chamber. The pressure of the breathable fluid in the mixing chamber is communicated to a first sensing chamber associated with the first pilot valve and a second sensing chamber associated with a second pilot valve which controls the double diaphragm wall means. A first pressure differential is created between ambient air and the first sensing chamber for operating the first pilot valve, simultaneously, a second pressure differential is created between ambient air and the second sensing chamber for operating the second pilot valve. Aneroid means responsive to ambient air is connected to proportioning means for modifying the effectiveness of the first and second pressure differentials. This modification will ratio the available oxygen and ambient air into the mixing chamber to provide a breathable fluid capable of maintaining physiological well being in a recipient. An indicator means associated with the first servo valve has a blinker means activated upon oxygen flowing into the mixing chamber to give a visual signal that oxygen flow regulation is taking place.

It is therefore the object of this invention to provide an oxygen regulator having oxygen controlled main valves to mix ambient air and oxygen as a function of altitude for maintaining the physiological well being of a recipient.

It is another object of this invention to provide an oxygen regulator with a visual indication of oxygen flow into a mixing chamber.

It is still a further object of this invention to provide an oxygen regulator with a four position actuation control means which reduces the pressure of the available oxygen supply to a predetermined uniform pressure for operating a pair of control servo valves and (1) to select a mixture of oxygen and ambient air; (2) to select only 100 percent oxygen; (3) to select 100 percent oxygen with safety pressure; and (4) to shut-off the regulator.

It is still a further object of this invention to provide an oxygen regulator having proportioning means responsive to aneroid means for controlling the ratio of ambient air and oxygen to meet the physiological requirements of a recipient.

These and other objects will be apparent from reading this specification and viewing the drawings.

DETAILED DESCRIPTION OF THE PREFERRED EMBODIMENT

Figure 1:
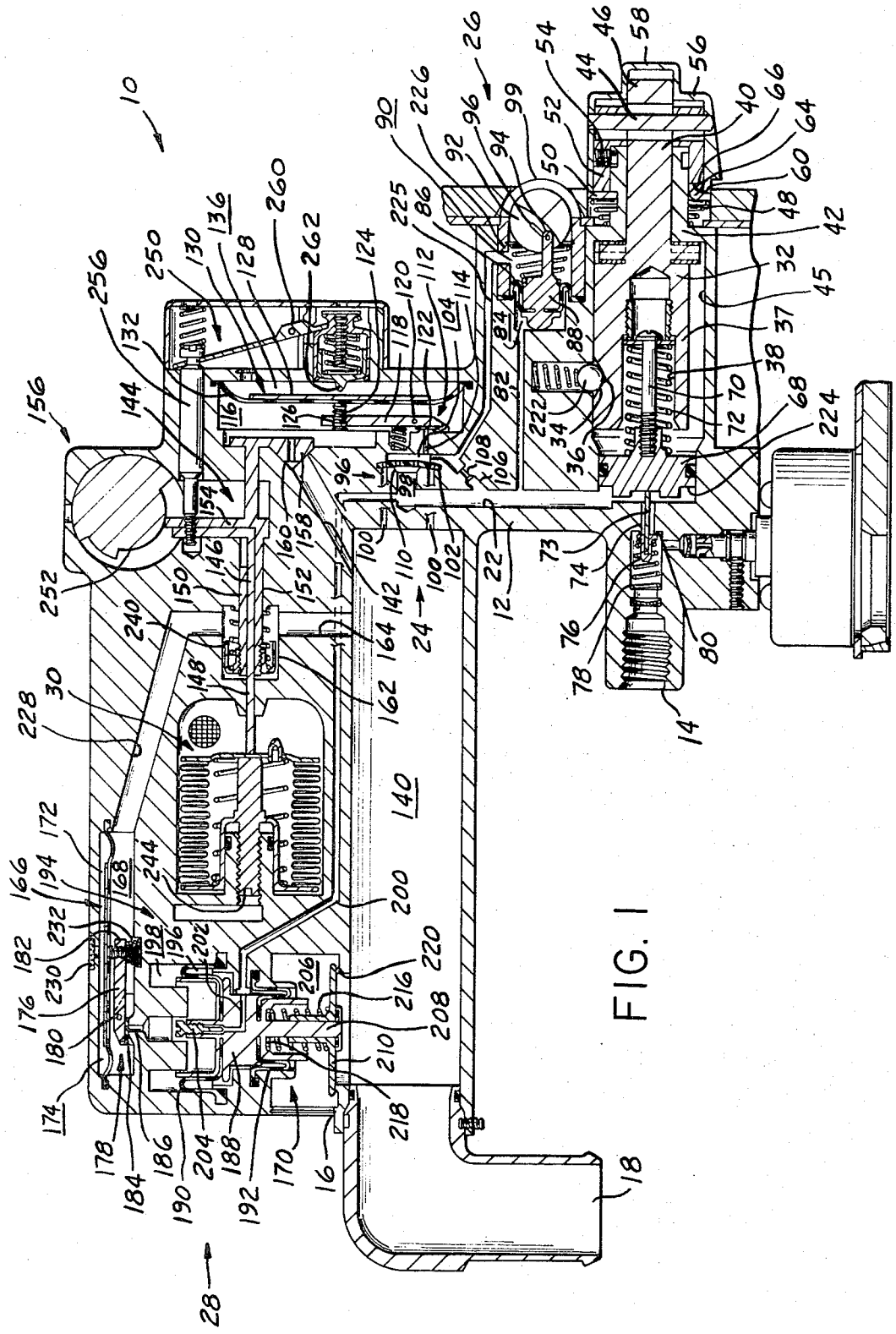
FIG. 1 is a schematic illustration of the oxygen regulator of this invention showing the regulator components positioned in response to an aneroid wherein ambient air alone without additional oxygen is sufficient to maintain the physiological well being of a recipient.

The oxygen regulator 10 shown in FIG. 1 consists of a housing 12 having a first inlet port 14 connected to a supply of oxygen at a predetermined pressure, a second inlet port 16 connected to ambient air and an outlet port 18 connected to the breathing mask (not shown) of a recipient in an aircraft. An actuator switching means 20, located adjacent the first inlet port 14, reduces the pressure of the available oxygen as it passes into a first conduit or passageway 22. This oxygen under reduced pressure in passageway 22 is simultaneously communicated to a first valve means 24, a flow indicator means 26 and diaphragm control means 28 to provide an instantaneous response allowing the ambient air and oxygen to be proportioned in accordance with the physiological needs of a recipient as determined by aneroid means 30.

The actuation switching means 20 includes a shaft 32 with a helical groove 34 on the periphery thereof located in a bore 45 in the housing 12. Tactile detents 36, only one shown, representative of OFF-ON, 100 percent oxygen and emergency positive pressure positions are located in the helical groove 34. A large diameter portion 37 of the shaft 32 has an axial bore 38 while a small diameter portion 40 extends through and is retained in a bearing surface 42 of the housing 12. The shaft 32 has a slot 44 extending through the small diameter portion 40 adjacent a square headed end 46. A spring 48 surrounds the bearing surface in the housing and holds a locking plate 50 against a keeper 52 which is fixed to the housing by set screw 54. A positioning cap 56 has a square headed end 58 which engages matching end 46 of shaft 32 as end 60 is positioned against and secured to locking plate 50 by inserting cross pin 62 through the slot 44. The keeper 52 has a series of position locks 64 corresponding to the tactile detents 36 on the shaft 32 which mate with tab 66 on the locking plate 50.

A pressure reducing piston 68 retained in the bore 45 has a rear stem 70 surrounded by a spring 72 retained in axial bore 38 in shaft 32 and front stem 73 which extend through restricted opening 74 in passageway 22. A spring 78 retained by the housing 12 urges a head 76 toward a seat 80 surrounding opening 74.

Oxygen under pressure passes through the first inlet port 14 around the head 76 and against the piston 68 to compress spring 72 and regulate the position of head 76 with respect to seat 80. When a balance point, representative of a predetermined pressure between the force created by oxygen acting on the piston 68 and the spring 72 is reached, head 76 will be positioned on seat 80. This predetermined oxygen pressure in conduit 22 will be communicated simultaneously through a static passage 82 into static chamber 84 of the indicator means 26. A diaphragm 86 attached to piston 88 separates the static chamber 84 from first actuation chamber 90. A spherical member 92 with indicia thereon is connected to the piston 88 through the retention of pin 94 in cam slot 96. The first actuation chamber 90 in turn is connected to second actuation chamber 104 of a control chamber 96 associated with the first valve means 24. Upon oxygen flowing from the control chamber 96 in response to a demand upon the first valve means 24, a pressure differential will be created across diaphragm 86 causing piston 88 to move and display a visual indication of the same in window 99 through the indicia on spherical member 92.

The first valve means 24 in the control chamber 96 regulates the flow of oxygen under pressure available in the passageway 22 from a flow chamber 98 into a plurality of flow passages 100 going into a mixing chamber 140 through establishment of a pressure differential across a diaphragm 102. The diaphragm 102 separates the control chamber 96 into a flow chamber 98 and the second actuation chamber 104. An actuation passage 106 connected to passageway 22 has a restriction 108 therein to control the time required for the oxygen under pressure to equalize in the actuation chamber 104 and the flow chamber 102. Upon equal pressure being established, the pressure in the actuation chamber 104 acting on the larger surface area of the diaphragm will urge the diaphragm 102 against seat 110 to prevent flow from the flow chamber 98 into passages 100.

The second actuation chamber 104 is connected to a first pilot valve means 112 by an actuation passage 114. The first pilot valve means 112 is located in a first sensing chamber 116. The first pilot valve means 112 includes a lever arm 118 which is pivotally attached to the housing 12 by a pin 120. The lever arm 118 has a face 122 located on one end adjacent the actuation passage 114 and an opening 126 for receiving connecting pin 124 from a backing plate 128 of a first wall means 130.

The wall means 130 includes a diaphragm 132 which separates the first sensing chamber 116 from a first ambient chamber 136. The first sensing chamber 116 in turn is connected to the mixing chamber 140 by a first sensing passage 142. The communication from the mixing chamber 140 of the pressure of a breathable fluid contained therein is modified by a proportioning valve means 144 which is responsive to the aneroid means 30.

The proportional valve means 144 includes a shaft 146 which extends through and is retained by a bearing wall 148 and a sleeve 150 located in bore 152. The sleeve 152 has a shoulder 154 projecting at a right angle into a manual control means 156. The end of shaft 146 abuts the shoulder to transmit any movement by the aneroid means 30 through the sleeve 150 to modify the pressure signal from the mixing chamber 140. This modification is achieved by the sleeve having a first face 158 varying the size of opening 160 from the first sensing passage 142 into the first sensing chamber 116 and a second face 162 located in a second sensing passage 164 going to a second sensing chamber 168 of a second wall means 166.

The second wall means 166 controls the operation through a second valve means 170 through a second pressure differential created across a diaphragm 172. The diaphragm 172 separates the second sensing chamber 168 from a second ambient chamber 174. Upon the creation of the second pressure differential, diaphragm 172 will exert a force on lever arm 176 of a second pilot valve means 178. The lever arm 176 is pivotally connected to the housing 12 by a pin 180 so that upon engagement of end 182 with the diaphragm 172, face 184 will uncover oxygen escape passage 186 from the diaphragm control means 28.

The diaphragm control means 28 includes a first diaphragm 190 and a second diaphragm 192 whose outer periphery is retained in the housing 12 and whose inner periphery is attached to a piston 188. The first diaphragm 190 separates an oxygen control chamber 194 into a first portion 196 and a second portion 198. The first portion 196 is directly connected to the first passageway 22 by a second passageway 200 and to the second portion through passage 202. A bleed screw 204 located in passage 202 is adjustable to regulate the communication oxygen under pressure from the first portion 196 to the second portion 198. The second diaphragm 192 separates the first portion 196 of the oxygen chamber from an ambient chamber 206. The piston 188 has a stem 208 which extends into the ambient chamber 206 and controls the second valve means 170.

The second valve means 170 includes a disc 210 which has an axial opening 212 surrounded by a cylindrical guide 214 located on the stem 208. A spring 216, which also surrounds the stem 208, is caged between the disc 210 and bottom 218 of the piston 188. The spring 216 will urge disc 210 against seat 220 to seal the mixing chamber 140 from undesired ambient air communication from chamber 206.

MODE OF OPERATION OF THE PREFERRED EMBODIMENT

Upon entering an aircraft as part of the check out procedure, wherein an oxygen supply is carried for each individual recipient on the aircraft, an oxygen regulator 10 is activated. The activation occurs by pushing in on cap 56 to depress spring 48 moving locking tab 66 out of lock 64 and turning the shaft 40, through the engagement of end 46 with square headed end 58, to move the resiliently held spherical ball 222 out of a detent 36 into a corresponding holding detent. As shaft 32 moves, spring 72 will act on piston 68 to unseat head 76 allowing oxygen under pressure to enter into the first passageway 22. When the oxygen under pressure in the first passageway acting on the face 224 develops a force greater than that of spring 72, head 76 will again be moved against seat 80 until the oxygen pressure in passageway 22 is reduced.

The oxygen pressure in passageway 22 is simultaneously communicated through passage 82 to static chamber 84, to flow chamber 98 of the first valve means 24, and to portion 196 of the oxygen control chamber of the diaphragm control means 28.

Initially, the oxygen under pressure in flow chamber 98 will flow around seat 110 into passages 100 until the delayed flow of oxygen through restriction 108 into actuation chamber 96 is equal to the pressure of the oxygen in the flow chamber 98. With equal pressures in chambers 96 and 104 a correspondingly larger force will be created across diaphragm 102 in chamber 104 causing the diaphragm to be moved into sealing engagement with seat 110. At the same time, this oxygen pressure will be communicated through passage 225 into actuation chamber 90. With equal pressure in chambers 84 and 90, spring 226 will move piston 88 to the left as viewed in FIG. 1, moving the spherical member 92 causing the indicia thereon to indicate a static flow condition.

After the oxygen under pressure in the first portion 196 of the oxygen chamber 194 has passed through restricted passage 202 into the second portion 198, a pressure differential with ambient chamber 206 will move diaphragm control means 28 toward the ambient air inlet 16.

At ground level, the aneroid means 30 will position the proportioning valve means 144 in the manner shown in FIG. 1. With the outlet 18 connected to a breathing mask (not shown), a recipient can inhale the breathable fluid in the mixing chamber 140. As the breathable fluid is used the pressure of the remaining fluid contained therein is correspondingly reduced. This remaining pressure is communicated through sensing passage 228 into sensing chamber 168. Ambient air pressure is freely communicated through filter opening 230 into ambient chamber 174. With ambient pressure in chamber 174 and a reduced pressure in chamber 168, a pressure differential is created across diaphragm 172. This pressure differential acts on resiliently positioned stem 232 causing lever arm 176 to pivot on pin 180 and open passage 186. With passage 186 opened, the oxygen under pressure in the second portion 198 escapes into the sensing chamber 168. The oxygen under pressure in the first portion 196 and ambient air pressure now combine to move diaphragm valve means 188 away from the seat 220 to allow ambient air to enter through the inlet port 16 into the mixing chamber 140.

Figure 2:
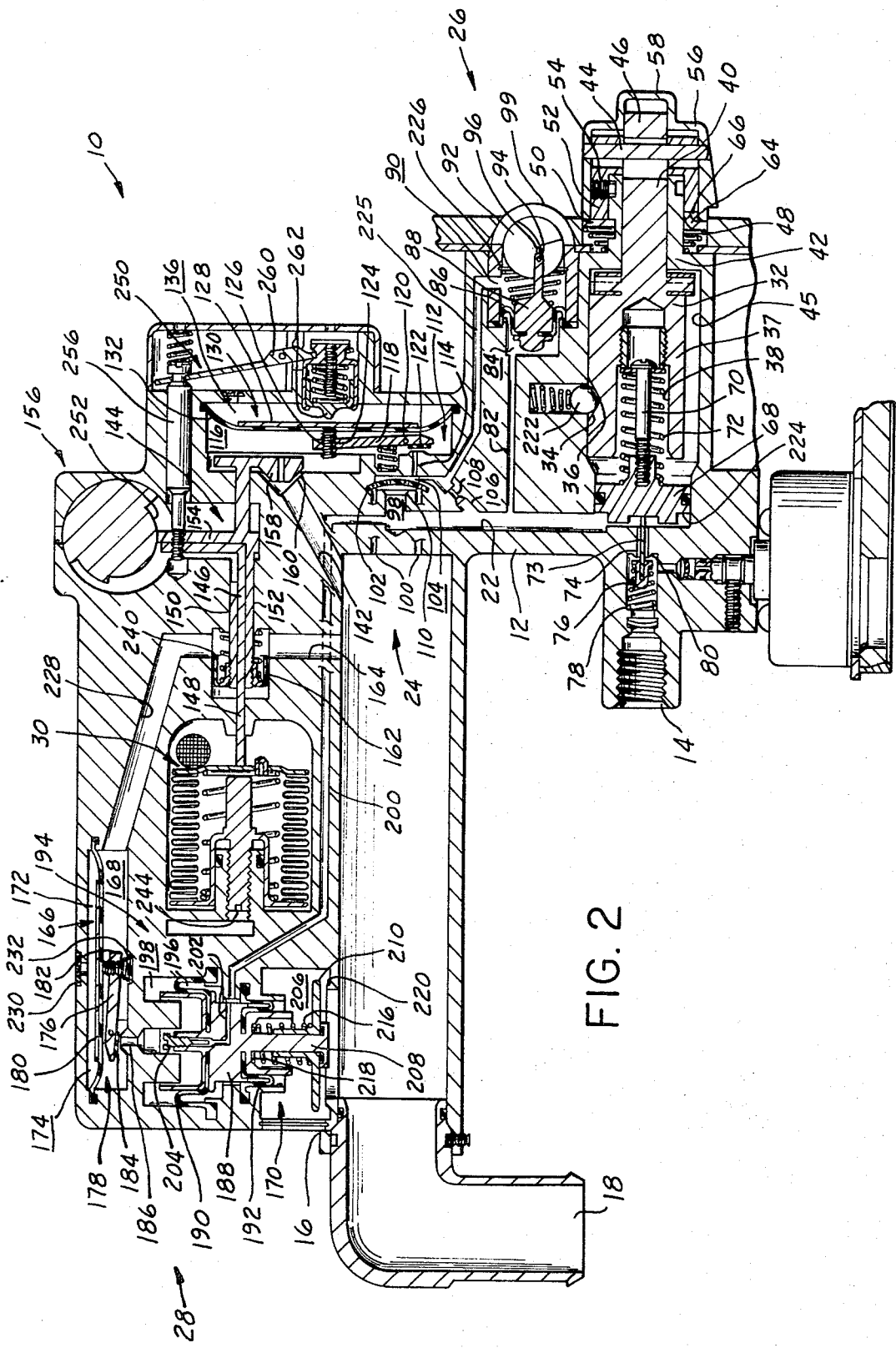
FIG. 2 is a schematic illustration of the oxygen regulator of FIG. 1 showing the regulator components positioned in response to the aneroid to provide proportioning of the oxygen and ambient air to meet a change in physiological requirements developed by a change in altitude.

As the aircraft increases in altitude, the aneroid means 30 will sense the change in ambient air through sensing ports 234. The change in altitude will cause the aneroid means 30 to expand causing shaft 146 to move sleeve 150 to the right as shown in FIG. 2. As the sleeve moves to the right, the first sensing passage 142 is opened by face 158 moving away from seat 160 while the second sensing passage 228 is closed by cylindrical cover 240.

At this altitude, upon a recipient inhaling the breathable fluid from the mixing chamber 140, the reduced pressure in the mixing chamber 140 is proportionally communicated to the first sensing chamber 116 and the second sensing chamber 168. With a reduced pressure in chamber 116 and ambient pressure in chamber 136, a pressure differential will be created causing the lever arm 118 to rotate and allow the oxygen under pressure in the first actuation chamber 104 to escape into the first sensing chamber 116. Now, the oxygen in the flow chamber 98 will move diaphragm 102 away from seat 110 allowing the oxygen under pressure in passageway 22 to flow through the plurality of passages 100 into the mixing chamber 140. With the oxygen flow from the actuation chamber 104, a corresponding reduction in pressure in chamber 90 will also occur. The pressure of the oxygen in chamber 84 will now move piston 88 causing the spherical member 96 to rotate and display indicia in window 99 to so indicate this.

Simultaneously, as described above at ground level, the diaphragm valve means 28 will correspondingly be operated and ambient air will enter the mixing chamber 140 through inlet 16. When the combined flow of ambient air and oxygen through passages 100 have raised the pressure of the fluid in the mixing chamber to a predetermined value, this will be communicated to the first and second sensing chambers 116 and 168, respectively, eliminating the pressure differentials across diaphragms 132 and 172. With the pressure differentials eliminated, the resiliently positioned lever arms 118 and 176, of the pilot valves 112 and 166, will rotate and the faces thereon will seal openings 114 and 186, respectively. With openings 114 and 186 sealed, the oxygen under pressure will again equalize on both sides of diaphragm 102 and diaphragm piston means 188 to interrupt communication from the flow chamber 98 and ambient chamber 206 into the mixing chamber 140. The above cycle is repeated with each inhalation demand, on the mixing chamber 140, only the proportion of ambient air and oxygen admitted to the mixing chamber will change with an increase in altitude.

At some predetermined altitude, which can be adjusted by turning screw 244, the aneroid means 30 will have moved to completely close the second sensing passage 228 by cover 240, thus only oxygen will be admitted into the mixing chamber 140. In this position, arm 144 will have moved lever spring arrangement 250 to apply a slight pressure on the diaphragm 132 to provide positive pressure breathing. This can also be achieved by the engagement of cam 252 on the manual control 156. The cam will move shaft 256 to rotate the lever arm 260 to move the resiliently held tip 262 against the diaphragm to aid the ambient air pressure force in establishing the operational pressure differential across the diaphragm 132 upon a depletion of the oxygen in the mixing chamber 140.

We claim:

1. An oxygen regulator for use in an aircraft, comprising:
    a housing having a mixing chamber connected to a first inlet port through a first passageway, a second inlet port through a second passageway, and an outlet port adapted to be connected to a breathing means, said first inlet port being connected to a source of oxygen under pressure, said second inlet port being connected to ambient air, said mixing chamber being adapted to retain a breathable fluid under pressure capable of maintaining the physiological well being of a recipient;

actuation means adjacent said first inlet port for controlling the flow of said oxygen into said first passageway;

first wall means located in and separating a first chamber in said housing into a first sensing chamber and a first ambient chamber, said first sensing chamber being connected to said mixing chamber by a first sensing passage, said first sensing passage being adapted to carry a pressure signal representative of the breathable fluid under pressure in said mixing chamber to said first sensing chamber, said first wall means being responsive to and moved by a first pressure differential created between said first sensing chamber and said first ambient chamber by said pressure signal and ambient air;

first valve means responsive to movement of said first wall means for allowing said oxygen flow to pass from said first passageway into said mixing chamber;

second wall means located in and separating a second chamber in said housing into a second sensing chamber and a second ambient chamber, said second sensing chamber being connected to said mixing chamber by a second sensing passage, said second sensing passage being adapted to carry said pressure signal representative of the breathable fluid under pressure in said mixing chamber to said sensing chamber, said second wall means being responsive to and moved by a second pressure differential created between the second sensing chamber and said second ambient chamber by said pressure signal and ambient air;

third wall means located in and separating a third chamber in said housing into an oxygen chamber and a third ambient chamber, said oxygen chamber being connected to said first passageway to receive said oxygen under pressure contained therein, said oxygen chamber being separated into a first section and a second section by a restriction, said restriction regulating the flow of oxygen under pressure from the first section into the second section, said third wall means moving in response to a third pressure differential created between the first and second sections of the oxygen chamber and said third ambient chamber;

second valve means responsive to movement of said second wall means for communicating said second section of the oxygen chamber with said second sensing chamber to eliminate said third pressure differential;

third valve means connected to said third wall means which is now moved by a fourth pressure differential created between the first section and the second section and said third ambient chamber and the first section, said third valve means upon moving controlling the flow of ambient air from the third ambient chamber into said mixing chamber through said second inlet port; and control means responsive to changes in altitude for modifying the pressure signal communicated through said first sensing passage and the second sensing passage by proportionally restricting the creation of said first and second pressure differential respectively to allow ambient air and oxygen under pressure into said mixing chamber which satisfies the physiological needs of said recipient.

2. The oxygen regulator, as recited in claim 1, further comprising:

blinker means connected to said first passageway for visually indicating oxygen flow past said first valve means into said mixing chamber.

3. The oxygen regulator, as recited in claim 2, wherein said first valve means includes:

a first diaphragm located in and separating a control chamber into a first flow chamber and an actuation chamber, said first flow chamber being connected to said first passageway by a centrally located oxygen passage and to said mixing chamber by a plurality of flow passages, said actuation chamber being connected to said first sensing chamber by a first actuation passage, said actuation chamber being connected to said first passageway by a second actuation passage with a restriction through which said oxygen under pressure passes into said first flow chamber;

first pilot valve means having a first lever arm pivotally attached to said housing with one end in contact with said first wall means and another end with a face thereon; and a first resilient means connected to said first lever arm for urging said face against said housing surrounding said first actuation passage for preventing oxygen under pressure in the actuation chamber from being communicated into said first sensing chamber, said oxygen under pressure in said actuation chamber moving said diaphragm against a seat surrounding said oxygen passage to prevent oxygen flow therethrough into said flow chamber.

4. The oxygen regulator, as recited in claim 2, wherein said blinker means includes:

a fourth wall means located in and separating a fourth chamber into a static pressure chamber and a second flow chamber, said static pressure chamber being connected to said first passageway through a static pressure to receive the oxygen under pressure therein, said flow chamber being connected to said actuation chamber by a third actuation passage to receive the oxygen under pressure contained therein; and indicator means positioned by movement of said fourth wall means responding to a fifth pressure differential between said static chamber and said second flow chamber for visually indicating said fifth pressure differential.

5. The oxygen regulator, as recited in claim 4, wherein said second valve means includes:

a second pilot valve means having a second lever arm pivotally attached to said housing with one end in contact with said second wall means and another end with a face thereon; and a second resilient means connected to said second lever arm for urging said face thereon against the housing surrounding a relief passage connecting the second section of said oxygen chamber with said second sensing chamber, said second pressure differential overcoming said second resilient means to allow oxygen under pressure in the second section to flow into said second sensing chamber and thereby eliminate said third pressure differential.

6. The oxygen regulator, as recited in claim 5, wherein said third wall means includes:
   piston means having a passage therethrough for connecting said first section with the second section of said oxygen chamber; and
   an adjustable valve associated with said piston means for establishing said restriction for regulating the flow of oxygen from the first section to the second section.

7. The oxygen regulator, as recited in claim 6, wherein said third wall means further includes:
   a first diaphragm fixed to said housing and secured to said piston means for establishing said second section of the oxygen chamber with said housing; and
   a second diaphragm fixed to said housing and secured to said piston for establishing said first section in the oxygen chamber, with said first diaphragm and said housing.

8. The oxygen regulator, as recited in claim 7, wherein said piston means inclues:
   a stem attached to said piston and extending into said third ambient chamber.

9. The oxygen regulator, as recited in claim 8, wherein said third valve means includes:
   a disc having an axial opening through the center thereof with a face on one side thereon;
   a cylindrical guide attached to said disc and adjacent said axial opening, said cylindrical guide surrounding said stem for aligning said disc on said piston means;
   a cap attached to said stem, said cap engaging said disc causing the disc to be correspondingly moved as the piston means is moved by said third and fourth pressure differentials; and
   a spring located between said piston means and said disc for urging said face toward said second inlet port, said spring allowing said cylindrical guide to move on said stem to vent said breathable fluid from said mixing chamber upon the pressure thereof reaching a predetermined value.

10. The oxygen regulator, as recited in claim 9, wherein said control means includes:
    aneroid means located in a sixth chamber, said sixth chamber being in free communication with ambient air;
    a shaft having one end connected to said aneroid means and another end extending through a bearing wall of said housing;
    a sleeve surrounding said shaft having a shoulder abutting said another end, said sleeve having a first face thereon which extends into said first passage going to the first sensing chamber and a second face thereon which extends into said second passage going to the second sensing chamber, said aneroid moving said sleeve through said shaft from a first position where said first face closes said first passage while said second face unobstructs said second passage through a variable number of positions corresponding to an increase in altitude to a final position where said first face unobstructs said first passage while said second face closes said second passage.

11. The oxygen regulator, as recited in claim 10, wherein said control means further includes:
    a lever arm connected to said shoulder of the sleeve and pivotally retained in the housing adjacent said first ambient chamber; and
    spring means connected to said lever arm and said first diaphragm for providing a connection with said aneroid means to provide automatic pressure breathing above a predetermined altitude.

* * * * *